United States Patent
Maeda et al.

(10) Patent No.: US 10,682,913 B2
(45) Date of Patent: Jun. 16, 2020

(54) VEHICLE DISPLAY DEVICE

(71) Applicant: Yazaki Corporation, Tokyo (JP)

(72) Inventors: Tomohiro Maeda, Shizuoka (JP);
Tomohiro Sugiyama, Shizuoka (JP);
Daisuke Nagashima, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 16/025,125

(22) Filed: Jul. 2, 2018

(65) Prior Publication Data
US 2019/0070960 A1    Mar. 7, 2019

(30) Foreign Application Priority Data

Sep. 1, 2017 (JP) ................. 2017-168798

(51) Int. Cl.
*B60K 35/00* (2006.01)
*B60K 37/02* (2006.01)

(52) U.S. Cl.
CPC ............. *B60K 35/00* (2013.01); *B60K 37/02* (2013.01); *B60K 2370/172* (2019.05); *B60K 2370/193* (2019.05); *B60K 2370/331* (2019.05); *B60K 2370/52* (2019.05)

(58) Field of Classification Search
CPC .. B60K 35/00; B60K 37/02; B60K 2370/193; B60K 2370/331; B60K 2370/52; B60K 2370/12
See application file for complete search history.

(56) References Cited

U.S. PATENT DOCUMENTS

| 2014/0063718 | A1* | 3/2014 | Yasumoto | B60K 35/00 361/679.21 |
| 2015/0379773 | A1* | 12/2015 | Konishi | B60K 37/02 345/633 |
| 2016/0178919 | A1* | 6/2016 | Sato | G02B 27/2228 359/462 |
| 2017/0153453 | A1* | 6/2017 | Sato | B60K 35/00 |
| 2017/0174081 | A1 | 6/2017 | Nojiri | |

FOREIGN PATENT DOCUMENTS

JP    2016-011863 A    1/2016
JP    2016-38236 A    3/2016

* cited by examiner

*Primary Examiner* — Kevin Quarterman
(74) *Attorney, Agent, or Firm* — Sughrue Mion, PLLC

(57) ABSTRACT

A vehicle display device includes an accommodating unit mounted on a vehicle, a ring-like decorative member disposed inside the accommodating unit, and a device configured to change a state of the decorative member depending on a travel mode of the vehicle. The device configured to change a state of the decorative member may be a drive device configured to change a posture of the decorative member depending on the travel mode. The drive device may change a posture of the decorative member to be different from that in the other travel mode if a first travel mode in which responsiveness of behavior of the vehicle in response to a driver's manipulation input is higher than that in the other travel mode is selected.

8 Claims, 8 Drawing Sheets

VEHICLE DISPLAY DEVICE

CROSS-REFERENCE TO RELATED APPLICATION(S)

The present application claims priority to and incorporates by reference the entire contents of Japanese Patent Application No. 2017-168798 filed in Japan on Sep. 1, 2017.

BACKGROUND OF THE INVENTION

1. Field of the Invention

The present invention relates to a vehicle display device.

2. Description of the Related Art

In the related art, there is known a vehicle display device having a decorative member. In Japanese Patent Application Laid-open No. 2016-11863, a technology of a vehicle display device having a decorative member, a light source that irradiates the decorative member with light, and a virtual image generation unit that displays a virtual image between a vehicle driver and a decorative member is discussed.

There is a room for further improvement in serviceability of the decorative member. For example, if the decorative member has another function as well as the decorative purpose, it is possible to improve serviceability of the decorative member.

SUMMARY OF THE INVENTION

It is an object of the invention to provide a vehicle display device capable of improving serviceability of the decorative member.

In order to achieve the above mentioned object, a vehicle display device according to one aspect of the present invention includes an accommodating unit mounted on a vehicle; a ring-like decorative member disposed inside the accommodating unit; and a device configured to change a state of the decorative member depending on a travel mode of the vehicle.

According to another aspect of the present invention, in the vehicle display device, it is preferable that the device configured to change a state of the decorative member is a drive device configured to change a posture of the decorative member depending on the travel mode.

According to still another aspect of the present invention, in the vehicle display device, it is preferable that if a first travel mode in which responsiveness of behavior of the vehicle in response to a driver's manipulation input is higher than that in a travel mode other than the first travel mode is selected, the drive device changes a posture of the decorative member to be different from the posture in a travel mode other than the first travel mode.

According to still another aspect of the present invention, in the vehicle display device, it is preferable that if the first travel mode is selected, the drive device sets a posture of the decorative member to an upright posture in which a tilt angle of the decorative member with respect to a vehicle vertical direction is small, and if a travel mode other than the first travel mode is selected, the drive device sets a posture of the decorative member to a tilted posture in which the tilt angle is larger than that of in the upright posture.

According to still another aspect of the present invention, in the vehicle display device, it is preferable that the drive device is a device configured to change a posture and a position of the decorative member, the drive device places the decorative member in a center of an image display area inside the accommodating unit if the first travel mode is selected, and the drive device places the decorative member in a lower side of the image display area if a travel mode other than the first travel mode is selected.

According to still another aspect of the present invention, in the vehicle display device, it is preferable that the device configured to change a state of the decorative member includes a light source that irradiates the decorative member with light, the light source is turned on if a first travel mode in which responsiveness of behavior of the vehicle in response to a driver's manipulation input is higher than that in a travel mode other than the first travel mode is selected, and the light source is turned off if a travel mode other than the first travel mode is selected.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A vehicle display device according to an embodiment of the invention will now be described with reference to the accompanying drawings. Note that the invention is not limited to such embodiments. The elements described in the following embodiment include those easily anticipated by a person ordinarily skilled in the art or substantially the same ones.

Embodiment

Figure 1:
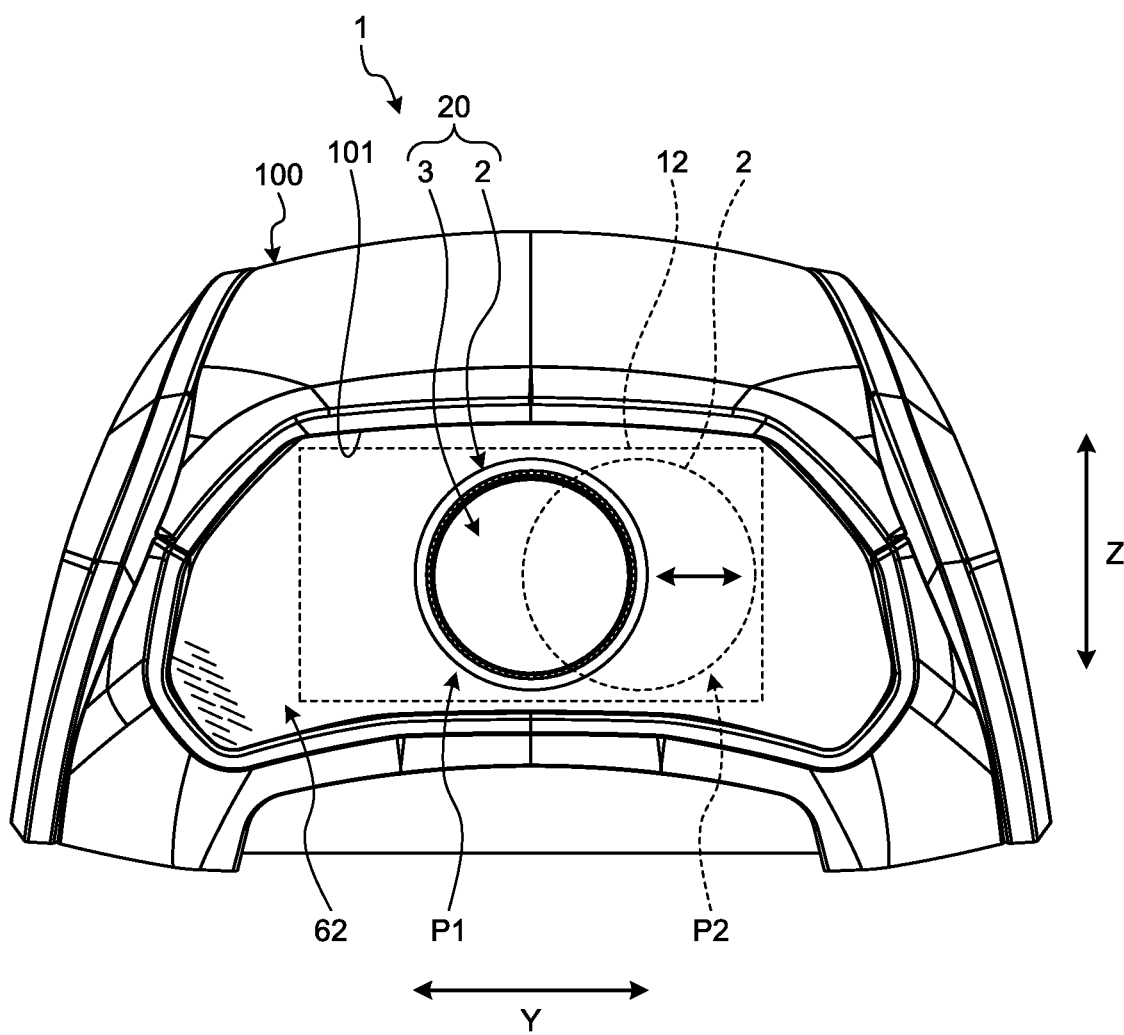
FIG. 1 is a front view illustrating a vehicle display device according to an embodiment.
Figure 2:
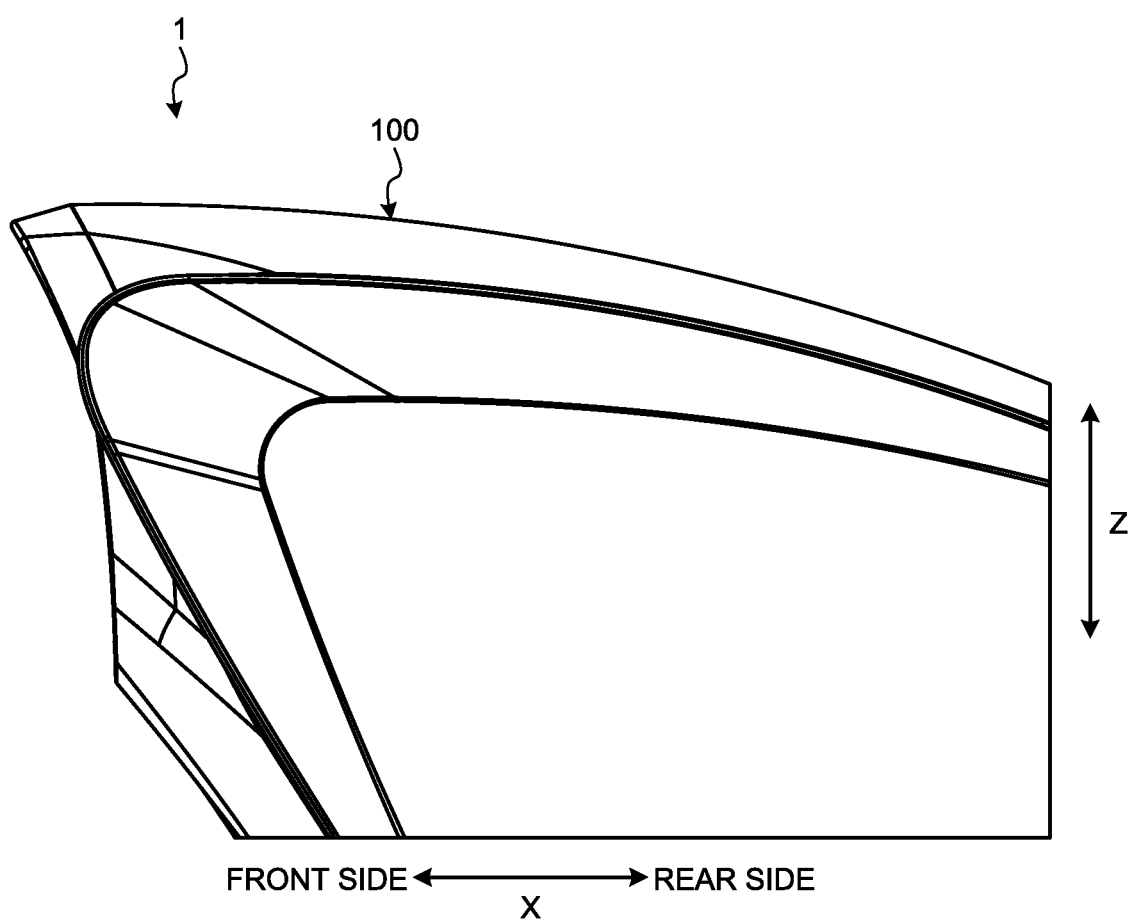
FIG. 2 is a side view illustrating a vehicle display device according to the embodiment.
Figure 3:
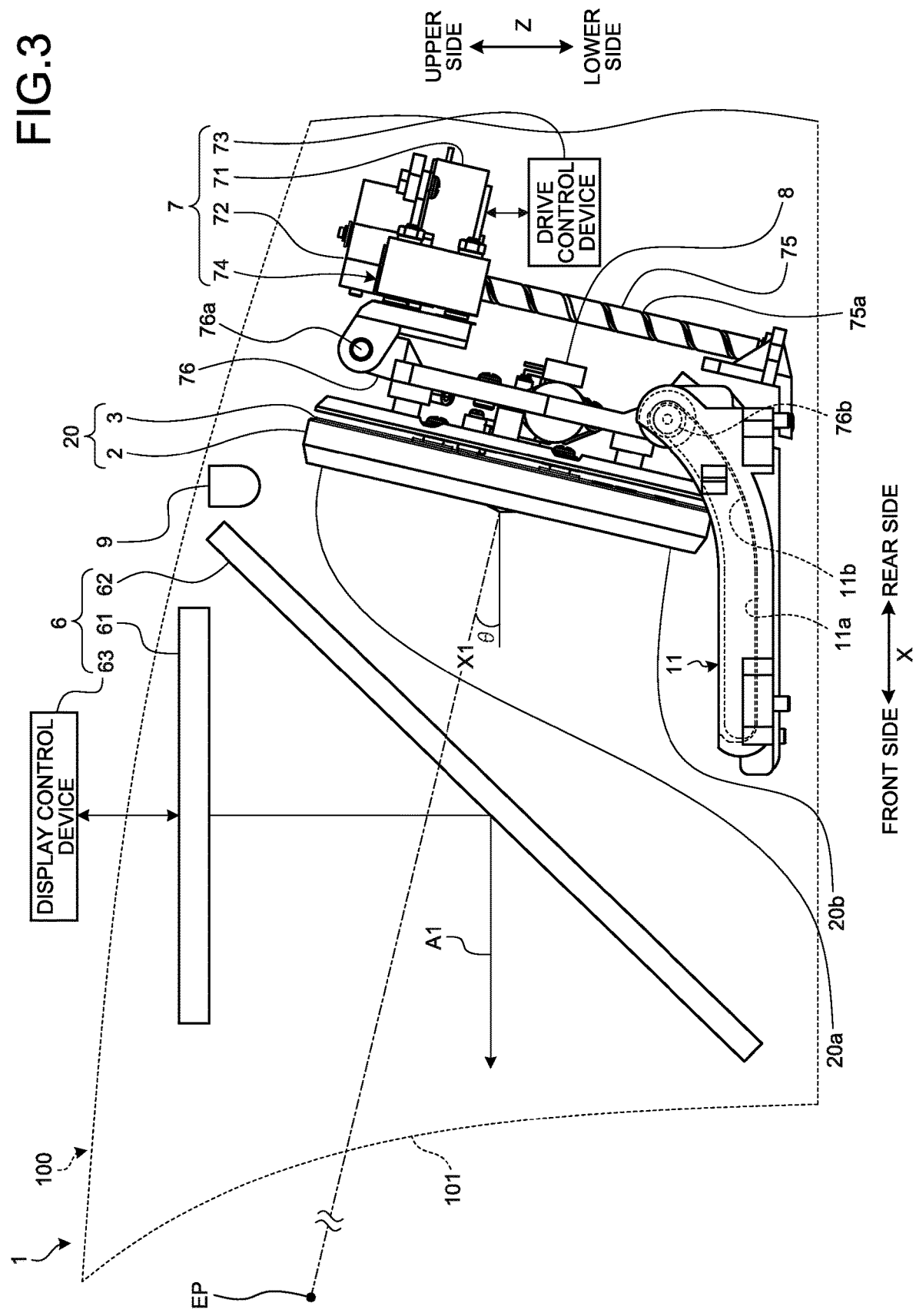
FIG. 3 is a side view illustrating an internal configuration of the vehicle display device according to the embodiment.
Figure 4:
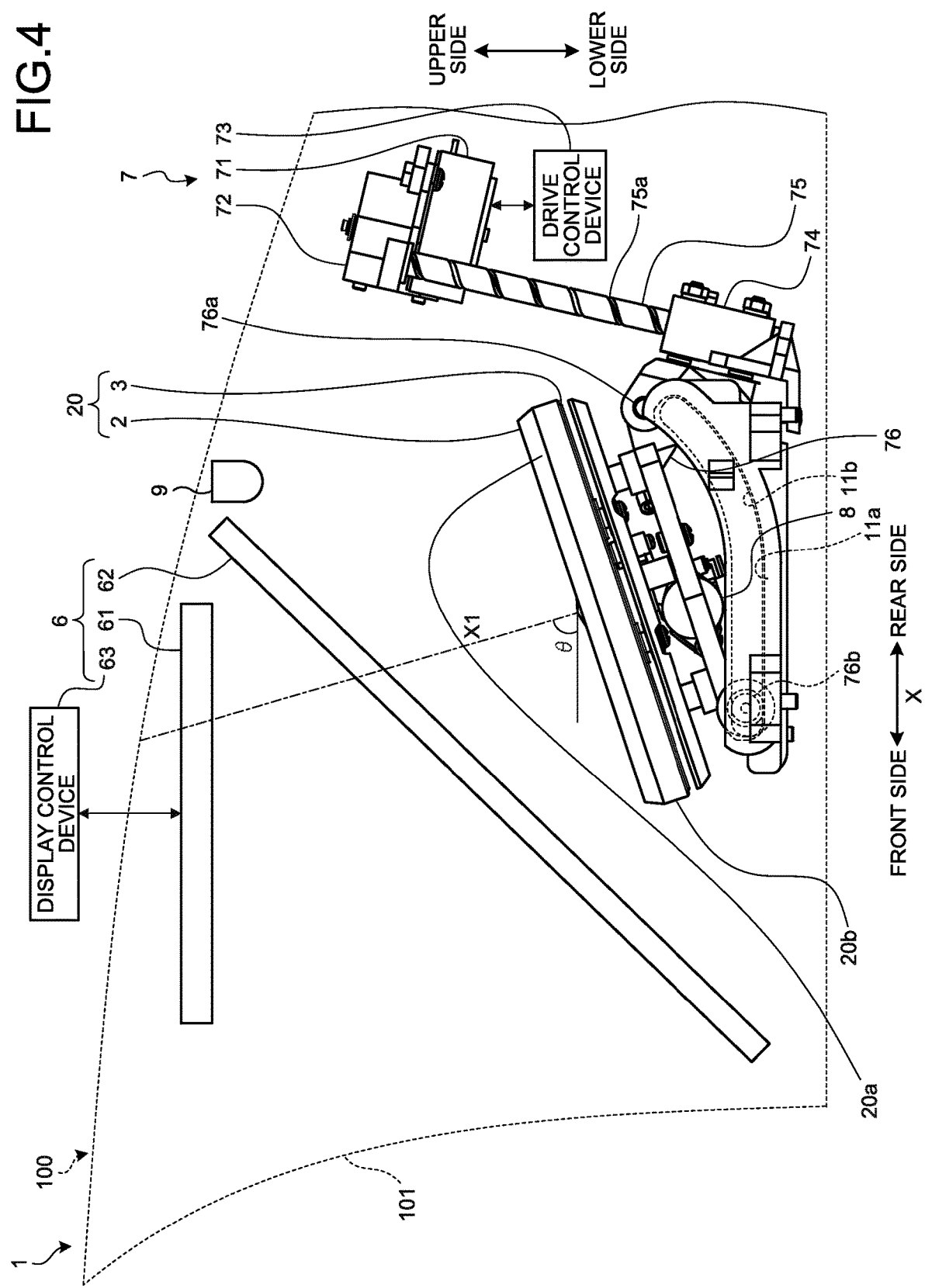
FIG. 4 is another side view illustrating the internal configuration of the vehicle display device according to the embodiment.
Figure 5:
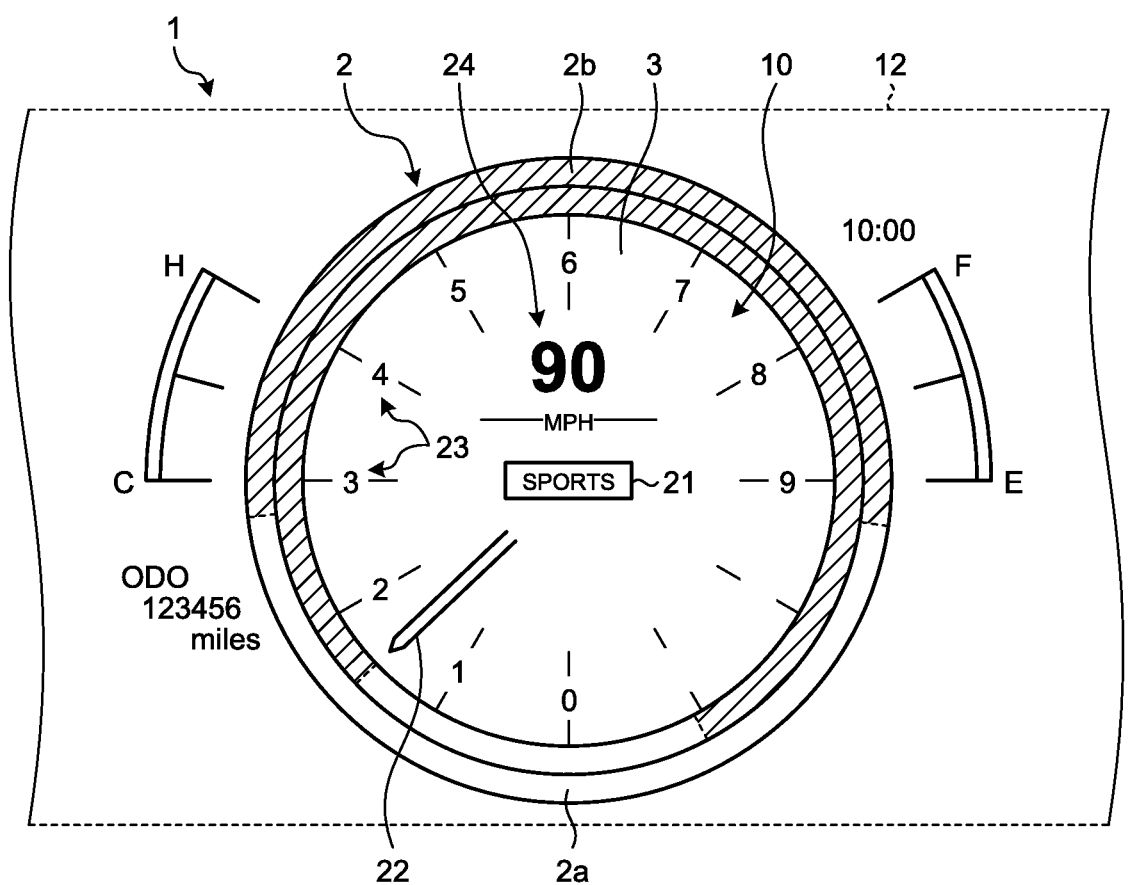
FIG. 5 is a diagram illustrating a vehicle display device in a first travel mode.
Figure 6:
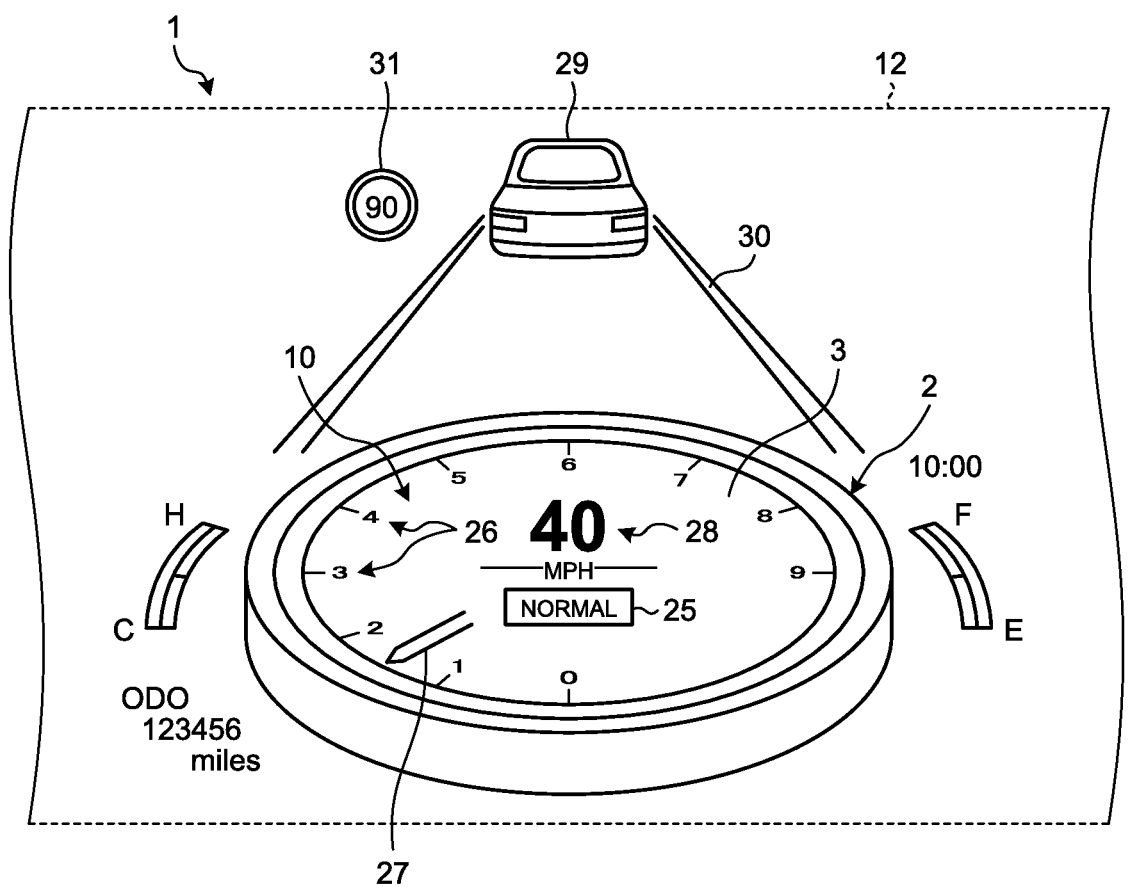
FIG. 6 is a diagram illustrating a vehicle display device in a second travel mode.
Figure 7:
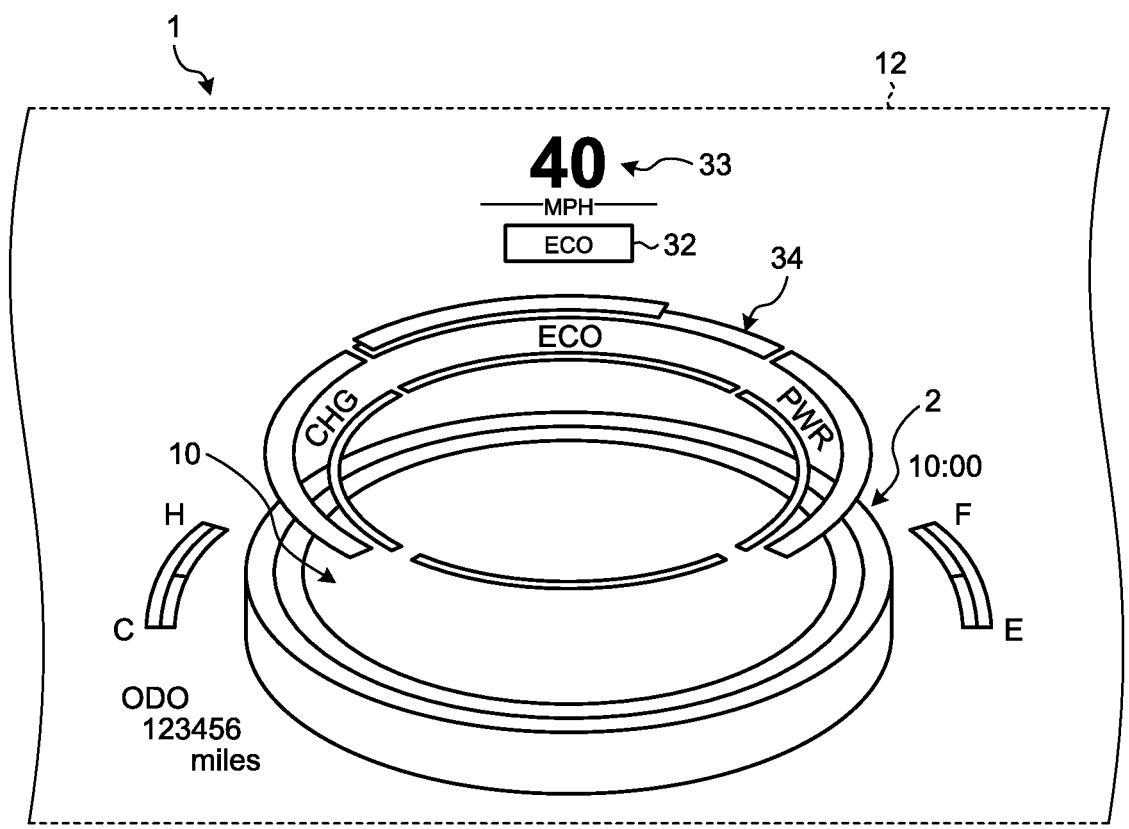
FIG. 7 is a diagram illustrating a vehicle display device in a third travel mode.

An embodiment will now be described with reference to FIGS. 1 to 8. The embodiment relates to a vehicle display device. FIG. 1 is a front view illustrating a vehicle display device according to an embodiment. FIG. 2 is a side view illustrating a vehicle display device according to the embodiment. FIG. 3 is a side view illustrating an internal configuration of the vehicle display device according to the embodiment. FIG. 4 is another side view illustrating an internal configuration of the vehicle display device according to the embodiment. FIG. 5 is a diagram illustrating a vehicle display device in a first travel mode. FIG. 6 is a diagram illustrating a vehicle display device in a second travel mode. FIG. 7 is a diagram illustrating a vehicle display device in a third travel mode.

A vehicle display device 1 according to this embodiment is mounted on a vehicle such as an automobile. As illustrated in FIGS. 1 to 3, the vehicle display device 1 according to this embodiment includes an accommodating unit 100, a decorative member 2, a virtual image display device 6, a drive device 7, a second drive device 8, and a light source 9. The accommodating unit 100 is a cylindrical member having a closed end in one side of the axial direction. The accommodating unit 100 is a light-blocking member formed of metal, synthetic resin, or the like. The accommodating unit 100 is placed in front of a vehicle driver's seat in a vehicle front-rear direction. The accommodating unit 100 is disposed, for example, in an opening of an instrument panel. The accommodating unit 100 is a trapezoidal member as seen in a front view.

The accommodating unit 100 has an opening 101 facing the driver's seat. In the description of the vehicle display device 1, a "depth direction X" refers to an axial direction of the accommodating unit 100. The depth direction X is typically a vehicle front-rear direction. In the depth direction X, a "front side" refers to a driver's seat side and is typically a vehicle rear side. In the depth direction X, the "rear side" is opposite to the driver's seat side and is typically a vehicle front side. The opening 101 is provided in the front face of the accommodating unit 100. In addition, a "height direction Z" refers to a height direction when the accommodating unit 100 is placed on the vehicle and is typically a vehicle vertical direction. A "width direction Y" refers to a direction perpendicular to the depth direction X and the height direction Z and is typically a vehicle width direction. In the width direction Y, the "left side" refers to a left side as seen from the driver's seat and is typically a vehicle left side. In the width direction Y, the "right side" refers to a right side as seen from the driver's seat and is typically a vehicle right side.

The opening 101 has a horizontally long shape in which a length of the width direction Y is longer than a length of the height direction Z. The decorative member 2 is disposed inside the accommodating unit 100. The decorative member 2 is a member formed in a ring-like shape. The decorative member 2 according to this embodiment is formed in a circular cylindrical shape. The decorative member 2 is formed of, for example, synthetic resin or metal such as aluminum. The surface of the decorative member 2 has, for example, a light color such as silver or white. In a case where the decorative member 2 is formed of synthetic resin, plating of a light color such as silver or white may be applied to a surface of the decorative member 2. Glossy plating may be employed. Mirror finishing or mat finishing may also be applied to the surface of the decorative member 2.

A dial plate 3 is arranged in rear of the decorative member 2. The dial plate 3 closes the inner side of the decorative member 2 from the rear side. The dial plate 3 is a circular plate member, for example, molded of synthetic resin. The dial plate 3 has, for example, a dark color such as black. Mat finishing may also be applied to the surface of the dial plate 3.

As illustrated in FIG. 3, the virtual image display device 6 has a display device 61, a half mirror 62, and a display control device 63. The half mirror 62 is a semitransparent member. The half mirror 62 reflects a part of the incident light and transmits the other part of the incident light. The half mirror 62 has a main body formed of transparent resin or glass and a half mirror layer. The half mirror layer is a metal or inorganic multilayer film formed through vapor deposition or the like on the surface of the main body. The half mirror 62 is arranged between the opening 101 and the decorative member 2 in the depth direction X. The half mirror 62 is tilted toward the rear side of the depth direction X as it extends upward in the height direction Z. The half mirror 62 is held by the accommodating unit 100 in the tilted posture described above.

The display device 61 projects an image toward the half mirror 62. The display device 61 is controlled by the display control device 63. The display device 61 is, for example, a liquid crystal display device such as a thin-film transistor liquid crystal display (TFT-LCD). The display device 61 is placed over the half mirror 62 in the height direction Z. In addition, the display device 61 faces the half mirror 62 in the height direction Z.

An image projected from the display device 61 is reflected by the half mirror 62 to the front side of the depth direction X as indicated by the arrow A1. The image reflected by the half mirror 62 is visually recognized as a virtual image focused on a position in rear of the half mirror 62 as seen from the eye point EP. The eye point EP is a position predetermined as a driver view position. The virtual image is focused on, for example, a front surface of the decorative member 2, slightly in front of or in rear of the front surface of the decorative member 2.

The virtual image display device 6 according to this embodiment displays a virtual image on an image display area 12 illustrated in FIG. 1. The image display area 12 is an area inside the accommodating unit 100 that can be viewed through the opening 101 from the eye point EP. The image display area 12 extends from the left end to the right end of the opening 101 in the width direction Y. In addition, the image display area 12 extends from the upper end to the lower end of the opening 101 in the height direction Z. The image display area 12 has, for example, a rectangular shape.

In the vehicle display device 1 according to this embodiment, the decorative member 2 and the dial plate 3 are movable. In the following description, the decorative member 2 and the dial plate 3 will be collectively referred to as a "movable member 20". The vehicle display device 1 has a drive device 7 and a second drive device 8 for moving the movable member 20. The movable member 20 can be placed in an upright position illustrated in FIG. 3 and a tilted position illustrated in FIG. 4. The movable member 20 may also stop between the upright position and the tilted position.

The upright position is a position where the movable member 20 faces the eye point EP. In a case where the movable member 20 is placed in the upright position, the eye point EP is placed on a center axial line X1 of the decorative member 2 as seen in a side view as illustrated in FIG. 3. In a case where the movable member 20 has the upright position, a tilt angle θ of the center axial line X1 of the movable member 20 with respect to the depth direction X is minimized. The movable member 20 having the upright position is tilted such that its upper end 20*a* is placed slightly in rear of a lower end 20*b*. Note that the tilt angle θ is also a tilt angle of the decorative member 2 with respect to the vehicle vertical direction. That is, if the tilt angle θ is set to 0, the decorative member 2 has an upright posture. As the tilt angle θ increases, the decorative member 2 is further tilted with respect to the vehicle vertical direction. The posture of the decorative member 2 having the upright position is an upright posture having a little tilt angle of the decorative member 2 with respect to the vehicle vertical direction.

The tilt position illustrated in FIG. 4 is a position in which the movable member 20 faces the display device 61. In a case where the movable member 20 has a tilted position, the tilt angle θ of the center axial line X1 of the movable member 20 with respect to the depth direction X is maximized. Note that the tilt angle θ of the center axial line X1 with respect to the depth direction X is also a tilt angle of the decorative member 2 with respect to the vehicle vertical direction. That is, in a case where the movable member 20 has a tilted position, the tilt angle of the decorative member 2 with respect to the vehicle vertical direction is maximized within a movable range of the decorative member 2. A posture of the decorative member 2 having the tilted position is a tilted posture in which a tilt angle of the decorative member 2 with respect to the vehicle vertical direction is larger than that of the upright posture.

The drive device 7 has a power source 71, a power transmission mechanism 72, a drive control device 73, and a conversion member 74. The drive device 7 is disposed on rear side of the movable member 20. The power source 71 is, for example, a rotary motor. The power transmission mechanism 72 rotates a shaft member 75 by virtue of a rotating force output from the power source 71. The conversion member 74 reciprocates along an axial direction of the shaft member 75 by virtue of the rotation of the shaft member 75. The shaft member 75 is a circular cylindrical member extending along the height direction Z. The shaft member 75 is tilted such that its upper end is placed slightly on rear side of the lower end. The tilt angle of the shaft member 75 corresponds to the tilt angle of the movable member 20 having an upright position.

A spiral trench portion 75a is formed on an outer circumferential surface of the shaft member 75. The conversion member 74 has a nut-like rotatable member engaged with the trench portion 75a. This rotatable member converts a rotational motion of the shaft member 75 into a rectilinear motion along the axial direction of the shaft member 75. The conversion member 74 moves along the shaft member 75 in the height direction Z as the shaft member 75 rotates around the axis of the shaft member 75.

The conversion member 74 is connected to the movable member 20 through a holding member 76. The holding member 76 is connected to the rear side of the movable member 20 and moves in the height direction Z along with the movable member 20. The conversion member 74 and the upper end of the holding member 76 are connected to each other through a rotational shaft 76a. The center axis direction of the rotational shaft 76a is the width direction Y. The holding member 76 is rotatable with respect to the center of the rotational shaft 76a.

A guided portion 76b is provided in the lower end of the holding member 76. The guided portion 76b is provided in both sides in the width direction Y of the holding member 76. The guided portion 76b according to this embodiment is a rotatable body such as a wheel supported rotatably. A guide member 11 for guiding the guided portion 76b is arranged inside the accommodating unit 100. The guide member 11 has a guide rail 11a. The guided portion 76b is inserted into the guide rail 11a and is rolled along the guide rail 11a. The guide rail 11a extends along the depth direction X as a whole. An arc-shaped portion 11b is provided in the rear end of the guide rail 11a. The arc-shaped portion 11b is curved upward in the height direction Z as it extends to the rear side in the depth direction X.

The drive control device 73 controls a magnitude of the rotational force output from the power source 71 and a rotational direction. In a case where the movable member 20 is in the upright position as illustrated in FIG. 3, the guided portion 76b is positioned in the rear end of the guide rail 11a. In this case, the conversion member 74 is positioned in the upper end of the shaft member 75. In a case where the movable member 20 moves from the upright position to the tilted position, the drive control device 73 controls the power source 71 such that the conversion member 74 moves downward. More specifically, the drive control device 73 rotates the shaft member 75 using the power source 71 such that the conversion member 74 moves downward.

As the conversion member 74 moves downward along the shaft member 75, the guided portion 76b is guided by the guide rail 11a and moves to the front side. As the conversion member 74 moves downward, the lower end 20b of the movable member 20 relatively moves to recede from the shaft member 75 toward the front side. As a result, the tilt angle of the movable member 20 with respect to the height direction Z increases. The drive control device 73 stops the output of the power source 71 as the movable member 20 reaches the tilted position. The tilted position is the lowermost position within the movable range of the decorative member 2 along the vehicle vertical direction.

In a case where the movable member 20 moves from the tilted position to the upright position, the drive control device 73 controls the power source 71 such that the conversion member 74 moves upward. More specifically, the drive control device 73 rotates the shaft member 75 using the power source 71 such that the conversion member 74 moves upward. As the conversion member 74 moves upward along the shaft member 75, the guided portion 76b is guided by the guide rail 11a and moves rearward. As the conversion member 74 moves upward, the lower end 20b of the movable member 20 relatively moves rearward to approach the shaft member 75. As a result, the tilt angle of the movable member 20 with respect to the height direction Z decreases. The drive control device 73 stops the output of the power source 71 as the movable member 20 reaches the upright position.

The vehicle display device 1 according to this embodiment further has a second drive device 8 for moving the movable member 20 in the width direction Y. The second drive device 8 is disposed in the holding member 76. The second drive device 8 has, for example, a second power source such as a motor and a second power transmission mechanism. The second power transmission mechanism converts a rotational motion caused by the output power of the second power source into a rectilinear motion in the width direction Y. The second drive device 8 is interposed between the holding member 76 and the movable member 20. The second drive device 8 relatively moves the movable member 20 with respect to the holding member 76 in the width direction Y. According to this embodiment, the operation of the second drive device 8 is controlled by the drive control device 73. That is, the drive control device 73 controls the output power of the second power source and the rotational direction.

The second drive device 8 places the movable member 20 in a first position P1 and a second position P2 illustrated in FIG. 1. The first position P1 is a center position in the width direction Y on the image display area 12 inside the accommodating unit 100. The second position P2 is a position closer to the end in the width direction Y relative to the first position P1 on the image display area 12. The second position P2 according to this embodiment is closer to the right side relative to the first position P1. In FIG. 1, the decorative member 2 placed in the second position P2 is indicated by a broken line.

As illustrated in FIG. 3, the light source 9 is disposed on the upper side in the height direction Z in the internal space of the accommodating unit 100. The light source 9 is disposed on the upper side in the height direction Z relative to the movable member 20. The light source 9 irradiates the element of the movable member 20 from upper side with light. For example, the light source 9 irradiates the decorative member 2 with light so that the decorative member 2 can be visually recognized from the eye point EP. The light source 9 may irradiate the decorative member 2 directly or indirectly with light. The light source 9 is controlled, for example, by the display control device 63. In addition, in the vehicle display device 1 according to this embodiment, the display control device 63 is communicably connected to the drive control device 73. The drive control device 73 controls the posture and position of the movable member 20 in response to a command of the display control device 63.

The drive device 7 according to this embodiment changes a state of the decorative member 2 depending on the vehicle travel mode. The vehicle travel mode is to set a vehicle travel characteristic in response to a driver's manipulation input or responsiveness of the vehicle behavior in response to a driver's manipulation input. The vehicle travel mode is selected by a driver. The drive device 7 changes the state of the decorative member 2 depending on the travel mode selected by a driver in a vehicle having a plurality of travel modes.

In the following description, the operation of the vehicle display device 1 will be described by assuming that a vehicle has first to third travel modes. In this embodiment, a travel mode having responsiveness of a vehicle behavior in response to a driver's manipulation input higher than those in other travel modes will be referred to as a "first travel mode". The first travel mode is a travel mode called, for example, a sports mode. In the first travel mode, compared to other travel modes, responsiveness of a vehicle behavior in response to a driver's driving manipulation is improved. For example, in the first travel mode, responsiveness of the output torque of the vehicle in response to a driver's acceleration manipulation is higher than those of other travel modes.

In the first travel mode, responsiveness of vehicle turning in response to a driver's steering manipulation may also be higher.

At least a second travel mode can be selected as a travel mode other than the first travel mode. According to this embodiment, a third travel mode may also be further selected. The second travel mode is a travel mode called, for example, a normal mode. In the second travel mode, responsiveness of a vehicle behavior in response to a driver's driving manipulation is lower than that of the first travel mode. The third travel mode is a travel mode called, for example, an eco mode. In the third travel mode, reduction of fuel consumption or power consumption has a top priority as a vehicle characteristic. In the third travel mode, responsiveness of a vehicle behavior in response to a driver's driving manipulation is lower than that of the first travel mode.

The display control device 63 is communicably connected to a control device of the vehicle side. The control device of the vehicle side is a control device having information on the travel mode selected by a driver. For example, the control device of the vehicle side is an electronic control unit (ECU) that comprehensively controls the vehicle. The display control device 63 acquires information on the selected travel mode from the control device of the vehicle side. The display control device 63 controls the drive device 7 on the basis of the acquired information. More specifically, if the selected travel mode is the first travel mode, the display control device 63 instructs the drive device 7 to place the decorative member 2 in the upright position. The drive device 7 places the decorative member 2 in the upright position as illustrated in FIG. 5 in response to an instruction of the display control device 63.

The display control device 63 turns on the light source 9 if the first travel mode is selected. The light source 9 is turned on in response to an instruction from the display control device 63 to irradiate the decorative member 2 with light. The decorative member 2 is illuminated by the light of the light source 9, so that a user can visually recognize the decorative member 2. The light of the light source 9 generates a high-luminance part 2a and a low-luminance part 2b in the decorative member 2. The high-luminance part 2a is a part brighter than the low-luminance part 2b by virtue of the light of the light source 9.

The display control device 63 displays a mode information image 21, a pointer image 22, an index image 23, and a vehicle speed image 24 on an area inside the decorative member 2. Each of the images 21, 22, 23, and 24 is a virtual image overlappingly displayed on the dial plate 3.

The mode information image 21 is an image presenting a current travel mode. The mode information image 21 includes characters representing the first travel mode. The mode information image 21 may have a color corresponding to that of the first travel mode, for example, a red image. According to this embodiment, the mode information image 21 is displayed in the approximate center of the dial plate 3.

The index image 23 is an image regarding an index indicated by the pointer image 22. According to this embodiment, the index image 23 includes characters or scales for showing a rotational speed of the engine. The index image 23 includes a plurality of character images and scale images. The plurality of character images and scale images are arranged at equal interval along an inner circumferential surface of the decorative member 2 along a circumferential direction.

The pointer image 22 is an image presenting a current rotational speed of the engine. The vehicle speed image 24 is an image presenting a current travel speed of the vehicle. The vehicle speed image 24 is displayed, for example, over the mode information image 21 in an image vertical direction.

Since the decorative member 2 has the upright position, visibility of the meter presentation is improved. For example, when an area 10 inward of the decorative member 2 (hereinafter, simply referred to as an "inner area") is seen from the eye point EP, the size changes depending on a posture of the decorative member 2. When the decorative member 2 is placed in the upright position, the inner area 10 is widened, compared to a case where the decorative member 2 has the tilted position. Therefore, it is possible to improve visibility by setting each of the images 21, 22, 23, and 24 presented in the inner area 10 in a large size. In addition, since the inner area 10 is large, a motion of the pointer image 22 becomes more dynamic, which is suitable for a characteristic of the first travel mode.

The display control device 63 instructs the drive device 7 to place the decorative member 2 in the tilted position if any travel mode other than the first travel mode is selected. The drive device 7 places the decorative member 2 in the tilted position in response to the instruction from the display control device 63. FIG. 6 illustrates a state of the vehicle display device 1 in the second travel mode. According to this embodiment, if the second travel mode is selected, the light source 9 is turned on.

As illustrated in FIG. 6, the decorative member 2 is placed in the tilted position in the second travel mode. A mode information image 25, a pointer image 27, an index image 26, and a vehicle speed image 28 are displayed on the inner area 10. The pointer image 27 and the index image 26 are bird's eye images. More specifically, the pointer image 27 and the index image 26 are displayed as bird's eye images depending on the tilt angle of the decorative member 2. That is, the pointer image 27 and the index image 26 are images obtained by emulating shapes of characters, scales, and needles on the dial plate 3 when they are seen obliquely downward in a bird's eye view.

The mode information image 25 and the vehicle speed image 28 are displayed as normal images instead of the bird's eye image. The mode information image 25 and the vehicle speed image 28 are displayed in the center portion of the inner area 10. A vehicle image 29, a lane image 30, and a traffic sign image 31 are displayed over the decorative member 2 in the image vertical direction. The vehicle image 29 and the lane image 30 are bird's eye images. The vehicle image 29 and the lane image 30 have the same viewpoint position as those of the pointer image 27 and the index image 26. Since the images 26, 27, 29, and 30 are displayed as bird's eye images, a depth perception is provided. The traffic sign image 31 provides notification of a guide or regulation regarding the current vehicle position. The traffic sign image 31 provides information on, for example, a speed limitation or the like.

FIG. 7 illustrates a state of the vehicle display device 1 in the third travel mode. According to this embodiment, if the third travel mode is selected, the light source 9 is turned on. As illustrated in FIG. 7, in the third travel mode, the decorative member 2 is placed in the tilted position. In the third travel mode, information is displayed mainly outside of the decorative member 2. A mode information image 32 and a vehicle speed image 33 are displayed over the decorative member 2 in the image vertical direction. The mode information image 32 may have a color corresponding to that of the third travel mode, such as a blue image.

A vehicle information image 34 is displayed in the third travel mode. The vehicle information image 34 is an image presenting an operation state of a vehicle drive system or a magnitude of the load. The vehicle information image 34 is displayed in the center portion of the image display area 12. The vehicle information image 34 according to this embodiment is displayed partially overlappingly with the decorative member 2. The vehicle information image 34 is a bird's eye image corresponding to the tilt angle of the decorative member 2. In this manner, in the third travel mode, the vehicle information image 34 necessary in a low fuel consumption driving is displayed in the center.

As described above, the vehicle display device 1 according to this embodiment has the accommodating unit 100 mounted on a vehicle, the decorative member 2, and the drive device 7. The decorative member 2 is a ring-like member disposed inside the accommodating unit 100. The drive device 7 is a device for changing the state of the decorative member 2 depending on the vehicle travel mode. As the state of the decorative member 2 changes depending on the vehicle travel mode, the current travel mode can be more intuitively recognized by a driver. In this manner, a function of presenting the current travel mode is added to the decorative member 2 according to this embodiment. Therefore, the vehicle display device 1 according to this embodiment can improve serviceability of the decorative member 2.

According to this embodiment, a device that changes the state of the decorative member 2 is a drive device 7 that changes a posture of the decorative member 2 depending on the travel mode. Since the posture of the decorative member 2 is different depending on the travel mode, a driver can easily visually recognize the travel mode.

When the first travel mode is selected, the drive device 7 according to this embodiment changes the posture of the decorative member 2 to be different from the postures of the decorative members 2 in the other travel modes. Note that the first travel mode has responsiveness of a vehicle behavior in response to a driver's manipulation input higher than those in the other travel modes. A driver who selects the first travel mode is regarded as a driver who wants to enjoy the driving itself. If the posture of the decorative member 2 is set to a posture matching a mental state of the driver who selects the first travel mode, it is possible to improve serviceability of the decorative member 2. In addition, it is possible to improve a rendering property by the posture change operation of the decorative member 2 itself.

The drive device 7 according to this embodiment makes the decorative member 2 to have an upright posture if the first travel mode is selected. The upright posture is a posture of the decorative member 2 having a small tilt angle with respect to the vehicle vertical direction. The upright posture is typically a posture in which the decorative member 2 confronts a driver (eye point EP). The upright posture of the decorative member 2 matches a mental state of a driver who selects the first travel mode and wants to enjoy driving. Meanwhile, if any travel mode other than the first travel mode is selected, the drive device 7 sets the posture of the decorative member 2 to a tilted posture. Compared to the upright posture, the tilted posture is a posture having a large tilt angle with respect to the vehicle vertical direction. By setting the decorative member 2 to the tilted posture, it is possible to display various images by widening the external area of the decorative member 2, compared to the upright posture.

The drive device 7 according to this embodiment is a device for changing a posture and a position of the decorative member 2. The drive device 7 changes the posture and the position of the decorative member 2 at the same time. In other words, the drive device 7 changes a position of the decorative member 2 in the vertical direction and changes the posture of the decorative member 2 depending on the vertical position. When the first travel mode is selected, the drive device 7 places the decorative member 2 in the center of the image display area 12 inside the accommodating unit 100. Since the decorative member 2 is placed in the center, a meter presentation using the decorative member 2 can be easily visually recognized by a driver.

Meanwhile, when any travel mode other than the first travel mode is selected, the drive device 7 places the decorative member 2 in the lower part of the image display area 12 in the vehicle vertical direction. That is, in the travel modes other than the first travel mode, the decorative member 2 is placed in the lower side in a tilted posture. As a result, a large display area is obtained over the decorative member 2. Therefore, various presentations can be made over the decorative member 2. For example, it is possible to represent a space having a depth perception by combining the decorative member 2 of the tilted posture and a three-dimensional image.

First Modification of Embodiment

A first modification of the embodiment will now be described. In the drive device 7 of the aforementioned embodiment, both the posture and the position of the decorative member 2 in the first travel mode are different from those in the other travel modes. Alternatively, the drive device 7 may be set such that any one of the posture and the position of the decorative member 2 in the first travel mode is different from those in the other travel modes. For example, the drive device 7 may be set such that the posture of the decorative member 2 in the first travel mode is different from the postures in the other travel modes without substantially changing the position of the decorative member 2. In this case, the drive device 7 may have a mechanism for changing the posture of the decorative member 2 without changing the position of the decorative member 2. For example, the drive device 7 may have a mechanism for pivoting the decorative member 2 around a rotational shaft along the width direction Y.

The position change of the decorative member 2 in the first travel mode and in the other travel modes is not limited to a change in the height direction Z, but may include a change in the width direction Y. For example, if the first travel mode is selected, the display control device 63 may place the decorative member 2 in the first position P1 using the second drive device 8. If a travel mode other than the first travel mode is selected, the display control device 63 may place the decorative member 2 in the second position P2 using the second drive device 8.

Second Modification of Embodiment

A second modification of the embodiment will now be described. The vehicle display device 1 may turn on or off the light source 9 depending on whether or not the selected travel mode is the first travel mode. For example, if the first travel mode is selected, the display control device 63 may turn on the light source 9. If a travel mode other than the first travel mode is selected, the display control device 63 may turn off the light source 9. While the light source 9 is turned off, the decorative member 2 is not substantially visually recognized by a driver.

In the first travel mode, the decorative member 2 is visually recognized by virtue of the light of the light source 9. Meanwhile, in a travel mode other than the first travel mode, the decorative member 2 is substantially invisible. Therefore, a driver can easily recognize whether or not the current travel mode is set to the first travel mode.

In a case where a plurality of travel modes are provided in addition to the first travel mode, a difference of the travel mode can be expressed using the display content on the virtual image display device 6. For example, a basic color of the virtual image displayed on the image display area 12 may change depending on the travel mode. For example, a background color of the image display area 12 may change depending on the travel mode. In a travel mode other than the first travel mode, the decorative member 2 is not visually recognized. Therefore, it is possible to provide various display modes using virtual images on the entire image display area 12.

As described above, the light source 9 according to this modification is turned on if the first travel mode is selected. The light source 9 is turned off if a travel mode other than the first travel mode is selected. The light source 9 changes a state of the decorative member 2 between a light-up state and a non-light-up state. In other words, the light source 9 changes the state of the decorative member 2 between a visually recognizable state and a substantially invisible state.

According to this modification, it is possible to easily identify which travel mode is selected as the current travel mode.

Third Modification of Embodiment

Figure 8:
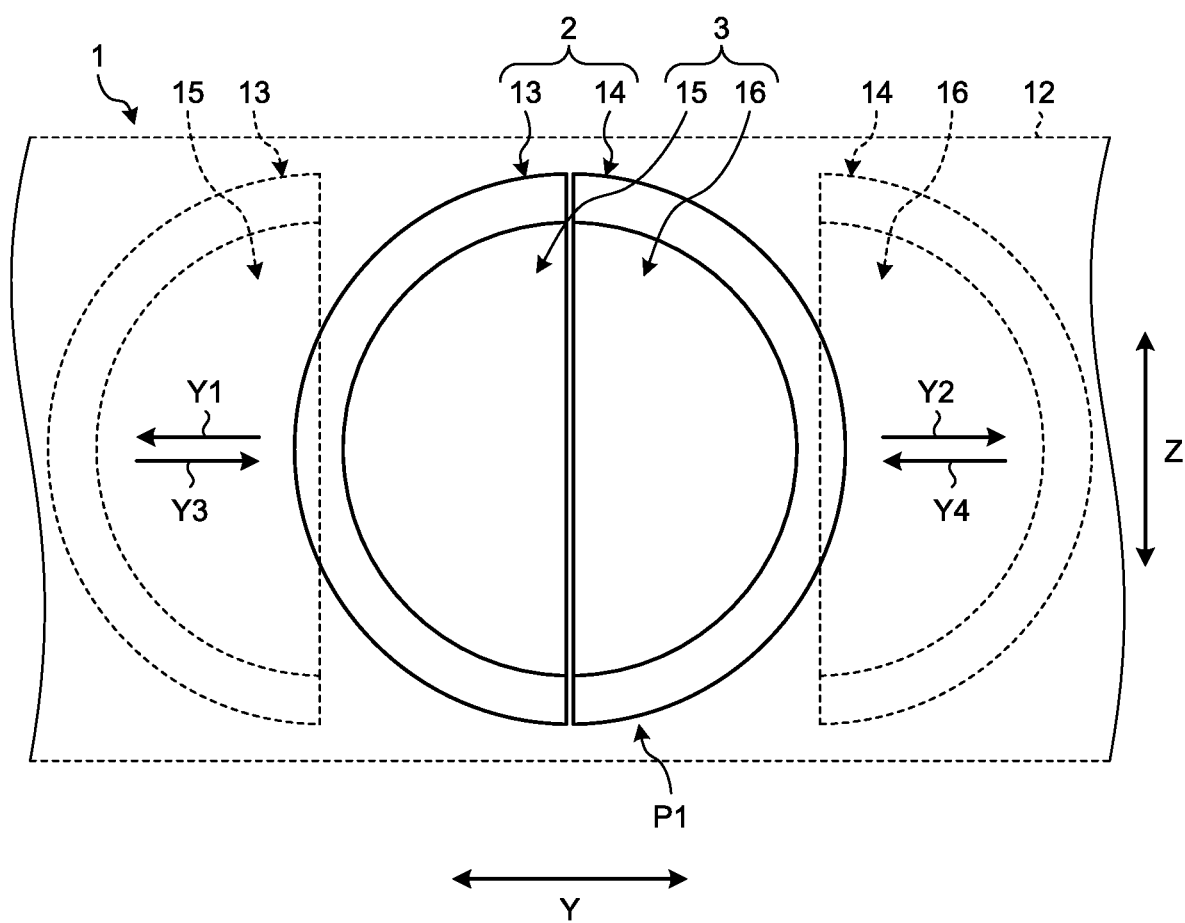
FIG. 8 is a diagram illustrating main parts of a vehicle display device according to a third modification of the embodiment.

A third modification of the embodiment will now be described. FIG. 8 is a diagram illustrating main parts of a vehicle display device according to the third modification of the embodiment. The decorative member 2 according to the third modification is a split type having a ring shape formed by combining a plurality of parts. The decorative member 2 of FIG. 8 is bisected in an axial symmetrical manner with respect to a center line of the height direction Z as seen in a front view. The decorative member 2 includes a first part 13 and a second part 14.

The first and second parts 13 and 14 have a half-ring shape.

Similarly to the decorative member 2, the dial plate 3 is also bisected. The dial plate 3 has first and second parts 15 and 16, each having a semicircular shape. The first part 15 is connected to the first part 13 of the decorative member 2. The second part 16 is connected to the second part 14 of the decorative member 2.

The vehicle display device 1 has a drive device for shifting the first parts 13 and 15 and the second parts 14 and 16 in the width direction Y. The drive device shifts the first parts 13 and 15 and the second parts 14 and 16 in different directions. For example, if the first parts 13 and 15 are shifted to the left side (in the arrow direction Y1), the drive device shifts the second parts 14 and 16 to the right side (in the arrow direction Y2). Meanwhile, if the first parts 13 and 15 are shifted to the right side (in the arrow direction Y3), the drive device shifts the second parts 14 and 16 to the left side (in the arrow direction Y4).

The first parts 13 and 15 and the second parts 14 and 16 abut on each other in the first position P1. That is, the drive device shifts the second parts 14 and 16 to the first position P1 simultaneously when the first parts 13 and 15 are shifted to the first position P1. Meanwhile, the drive device shifts the second parts 14 and 16 to recede from the first position P1 simultaneously when the first parts 13 and 15 are shifted to recede from the first position P1.

If the first travel mode is selected, the drive device places the first parts 13 and 15 and the second parts 14 and 16 in the first position P1. In other words, if the first travel mode is selected, the drive device combines and joins the first parts 13 and 15 and the second parts 14 and 16 with each other to form a ring shape of the decorative member 2. Meanwhile, if a travel mode other than the first travel mode is selected, the drive device separates the first parts 13 and 15 and the second parts 14 and 16 from each other. Therefore, in a travel mode other than the first travel mode, the decorative member 2 is split into a plurality of parts.

Since the decorative member 2 has a ring shape in the first travel mode, and the decorative member 2 is split into a plurality of parts 13 and 14 in the other travel modes in this manner, it is possible to allow the current travel mode to be easily recognized by a driver. Alternatively, the decorative member 2 may be split vertically or may be split into three or more parts.

Fourth Modification of Embodiment

A fourth modification of the embodiment will be described. A shape of the decorative member 2 is not limited to aforementioned ones. The ring-like decorative member 2 also includes a partially opened shape as well as a closed shape. The partially opened ring shape of the decorative member 2 described above may include, for example, a C-shape.

The image displayed on the image display area 12 is not limited to the virtual image. For example, display device such as liquid crystal display device may be arranged on the back side of the decorative member 2. In this case, the movement direction of the decorative member 2 is preferably set to the width direction Y. That is, the decorative member 2 moves in the width direction Y, but may not move in the height direction Z or perform a tilt/upright operation.

The contents described in the aforementioned embodiments and modifications may be suitably combined and executed.

According to the embodiment, there is provided a vehicle display device including: an accommodating unit mounted on a vehicle; a ring-like decorative member disposed inside the accommodating unit; and a device configured to change a state of the decorative member depending on a travel mode of the vehicle. In the vehicle display device according to the embodiment, a state of the decorative member changes depending on the travel mode of the vehicle. A user can identify the current travel mode on the basis of the state of the decorative member. Therefore, the vehicle display device according to the embodiment exhibits the effect capable of improving serviceability of the decorative member.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle display device comprising:
an accommodating unit mounted on a vehicle;
a ring-like decorative member disposed inside the accommodating unit;
a drive device configured to change a posture of the decorative member, and
a light source that irradiates the decorative member with light, wherein
the vehicle is configured to be operated in vehicle travel modes, the vehicle travel modes comprising a first vehicle travel mode in which vehicle behavior responsiveness based on a driver's manipulation input is higher than that in other vehicle travel modes,
the drive device is further configured to set the posture of the decorative member to an upright posture in which a tilt angle of the decorative member with respect to a vehicle vertical direction is small when the vehicle is operated in the first vehicle travel mode,
the light source is configured to be turned on when the vehicle is operated in the first vehicle travel mode and the light source is configured to be turned off when the vehicle is operated in a vehicle travel mode other than the first vehicle travel mode.

2. The vehicle display device according to claim 1, wherein
the drive device is further configured to set the posture of the decorative member to be different when the vehicle is operated in the first vehicle travel mode than when the vehicle is operated in a vehicle travel mode other than the first vehicle travel mode.

3. The vehicle display device according to claim 2, wherein
the drive device is further configured to set a posture of the decorative member to a tilted posture in which the tilt angle is larger than that which is set in the first vehicle travel mode when the vehicle is operated in the vehicle travel mode other than the first vehicle travel mode.

4. The vehicle display device according to claim 3, wherein
the drive device is also configured to change a position of the decorative member,
the drive device is configured to place the decorative member in a center of an image display area disposed inside the accommodating unit when the vehicle is operated in the first vehicle travel mode, and
the drive device is configured to place the decorative member in a lower side of the image display area when the vehicle is operated in the vehicle travel mode other than the first vehicle travel mode.

5. The vehicle display device according to claim 1, wherein the drive device is further configured to change a lateral position of the decorative member depending on which vehicle travel mode the vehicle is operated in.

6. The vehicle display device according to claim 1, wherein the drive device is further configured to change a vertical position of the decorative member depending on which vehicle travel mode the vehicle is operated in.

7. The vehicle display device according to claim 1, wherein the decorative member comprises a left side decorative member and a right side decorative member, and the drive device is further configured to horizontally move the left side decorative member and the right side decorative member.

8. The vehicle display device according to claim 3, further comprising:
a virtual image display device configured to display a pointer image and an index image on an area inward of the decorative member as bird's eye images depending on a tilt angle of the decorative member when a posture of the decorative member is set to the tilted posture.

* * * * *